United States Patent [19]

Jelli

[11] 4,148,965
[45] Apr. 10, 1979

[54] METHOD AND APPARATUS FOR PROCESSING A BODY HAVING A VITREOUS SURFACE

[75] Inventor: André Jelli, Tervuren, Belgium

[73] Assignee: BFG Glassgroup, Paris, France

[21] Appl. No.: 780,013

[22] Filed: Mar. 22, 1977

[30] Foreign Application Priority Data

Mar. 29, 1976 [LU] Luxembourg ............................ 74666

[51] Int. Cl.² ............................................. B32B 17/00
[52] U.S. Cl. .................................. 428/410; 65/64 C;
65/66; 427/248 E; 427/248 H; 427/248 J;
427/255; 427/299; 427/314; 427/407 A;
427/444; 428/432; 428/441; 428/442
[58] Field of Search .................... 427/314, 299, 407 A,
427/419 R, 444, 255, 248 E, 248 H, 248 J;
65/60 C, 66, 261, 262; 29/419 G, 527.1;
118/49.5; 428/410, 432, 441, 442

[56] References Cited

U.S. PATENT DOCUMENTS

| | | | |
|---|---|---|---|
| 2,519,059 | 8/1950 | MacConnell | 65/262 |
| 2,662,034 | 12/1953 | Mason et al. | 427/248 H |
| 2,876,133 | 3/1959 | Iler | 427/248 H |
| 3,171,728 | 3/1965 | Andersen | 65/262 |
| 3,264,720 | 8/1966 | Mott | 65/262 |
| 3,713,867 | 1/1973 | Parkinson | 427/314 |
| 3,836,386 | 9/1974 | Roy | 427/407 A |
| 3,856,498 | 12/1974 | Campagna | 427/299 |
| 3,876,410 | 4/1975 | Scholes | 427/255 |
| 3,888,705 | 6/1975 | Fletcher | 427/248 E |
| 3,993,835 | 11/1976 | Miedaner | 427/407 A |
| 4,022,601 | 5/1977 | Sopko | 427/255 |

*Primary Examiner*—Ronald H. Smith
*Assistant Examiner*—Janyce A. Bell
*Attorney, Agent, or Firm*—Spencer & Kaye

[57] ABSTRACT

A method of processing a body having a surface of which at least a portion is vitreous and during which the vitreous region or regions of the surface become(s) activated. While the surface is at elevated temperature, it is contacted by gaseous hydrogen in a non-oxidizing, dehydrated atmosphere, after such hydrogen has been conditioned by contact with a substance at elevated temperature which is capable of provoking the fixation of hydrogen to the vitreous region or regions of the surface.

17 Claims, 4 Drawing Figures

METHOD AND APPARATUS FOR PROCESSING A BODY HAVING A VITREOUS SURFACE

BACKGROUND OF THE INVENTION

The present invention relates to a method of processing a body having a surface of which at least a portion is vitreous and during which the vitreous region or regions of the surface become(s) activated. The invention includes processes in which organic materials are fixed to the thus activated surfaces, and extends to products made by the method and to apparatus for performing the method.

In general, in order to fix organic substances onto vitreous surfaces, it is necessary to use coupling agents capable of reacting with the vitreous material and with the organic substance. The most widely used coupling agents of this kind are organosilanes. These organosilane substances are used in numerous applications and can often provide a suitable bond between the organic substance and the inorganic vitreous material.

However, the use of organosilanes has a number of disadvantages. The most serious is that the bonds are relatively few or unstable in a moist medium, which is a considerable disadvantage when the body is intended for use in the external atmosphere and thus subject to weathering.

SUMMARY OF THE INVENTION

An object of the present invention is to provide a method for activating the vitreous surface of a body.

A further object of the present invention is to provide such a method which reduces the disadvantage associated with the use of organosilanes with respect to the relatively few or unstable bond in a moist medium and to provide such a method which permits the formation of a beginning of an organic chain which is bonded in a more stable manner to the vitreous material.

Another object of the present invention is to form activated centers comprising hydrogen or vitreous material at the surface of the body.

Additional objects and advantages of the present invention will be set forth in part in the description which follows and in part will be obvious from the description or can be learned by practice of the invention. The objects and advantages are achieved by means of the processes, instrumentalities and combinations particularly pointed out in the appended claims.

To achieve the foregoing objects and in accordance with its purpose, as embodied and broadly described, the present invention provides a method of processing a body having a surface of which at least a portion is vitreous and during which the vitreous region or regions of the surface become(s) activated, comprising contacting the surface, while it is at elevated temperature, with gaseous hydrogen in a non-oxidizing, dehydrated atmosphere, after such hydrogen has been conditioned by contact with a substance at elevated temperature which is capable of provoking the fixation of hydrogen to the vitreous region or regions of the surface, to thereby activate the vitreous surface.

An important advantage of the method of the present invention is that it provides an activated vitreous surface such that an organic radical can be directly grafted onto the siliceous lattice of the vitreous material without using products of the kind produced by the known methods. The method of the present invention can convert the vitreous surface into a state of activation which facilitates direct grafting of organic groups.

It has been found that when the aforementioned method is used, activated centers containing hydrogen and bonded to the atoms of the siliceous material appear at the surface thereof. The activated centers provide a stable beginning for subsequent grafting of organic chains.

Various hypotheses have been made regarding the exact function of the substance which conditions the hydrogen so that it can be grafted onto the vitreous surface. While not wishing to be bound to any particular hypothesis, in view of some observed results, it is possible that the substance reacts in transitory manner with molecular hydrogen to form very reactive nascent hydrogen, which is fixed to the vitreous surface. It has been found that the presence of the conditioning substance is essential for grafting hydrogen onto the surface.

Preferably, the substance which conditions the hydrogen comprises at least one metal selected from at least one of groups IIIB, IVB, VB, VIB, VIIB, or VIII of the Periodic Table of Elements, as shown in *McGraw-Hill Encyclopedia of Science and Technology*, Vol. 10, p. 19, 1971. Apparently, such metals and/or metal alloys combine with hydrogen to give compounds which exist only in solid form. These compounds readily decompose into metal and monohydrogen as soon as an attempt is made to melt them. They are probably solid solutions rather than true compounds, and owing to their small dimensions, the hydrogen atoms penetrate into the interstices of the crystal lattice of the metal without the interstices being appreciably deformed.

These metals, therefore, are particularly advantageous since, in the range of temperatures preferably used (above 600° C.) their hydrides decompose almost instantaneously by pyrolysis as they are formed in contact with the metal surface. Advantageously, the metal is chosen from Ti, Hf, Nb, Ta, Cr, W, Fe, Co, Ni, Pd, and Pt. It has been found that these metals react particularly advantageously with hydrogen and condition it so that it can readily be fixed to the vitreous material.

It is possible to locate the substance which conditions the hydrogen and the surface of the vitreous body in separate chambers, and pass a stream of a non-oxidizing, dehydrated atmosphere containing gaseous hydrogen from a first chamber where the hydrogen is conditioned to a second chamber where the substance is treated, but in practice it is more convenient for the surface of the vitreous body and the substance which conditions the hydrogen to be contained in the same heated chamber.

Preferably, the substance which conditions the hydrogen is in the solid state near the surface of the vitreous body. It is particularly advantageous to dispose the conditioning substance in the form of a solid component, e.g. a bar, near the vitreous material without thereby endangering the surface thereof.

Though the substance which conditions the hydrogen and the surface of the vitreous body can be maintained at different elevated temperatures, it is in general more convenient, especially when the substance and the surface are in the same heated chamber and/or close together, for the substance and the surface to be at substantially the same elevated temperature.

Advantageously, the surface of the vitreous body is kept at a temperature between 600° and 1000° C. during the activation treatment. It has been found that this temperature range is particularly suitable for fixing hydrogen to the vitreous material at the surface of the body.

Preferably, the non-oxidizing, dehydrated atmosphere contains hydrogen at a partial pressure of at least 10 mm Hg for a normal atmospheric pressure. it has been found that even this low hydrogen content is quite sufficient to obtain suitable activation of the vitreous surface. Of course, however, the results will be correspondingly better if the hydrogen content is higher. This may go up to the use of pure hydrogen.

Advantageously, the hydrogen containing atmosphere is used to scavenge at least one region of the vitreous surface. If hydrogen is entrained in a stream of non-oxidizing, dehydrated gas, the fixing of hydrogen onto the substrate surface is facilitated, the effect being improved in proportion as the hydrogen-containing gas is constantly renewed.

Preferably, the hydrogenated atmosphere is maintained at a pressure of at least 1 kg/cm$^2$. This pressure is amply sufficient to obtain a suitable yield from the operation. However, it has been found that pressure higher than atmospheric pressure produce an appreciable increase in the state of activation.

In one preferred embodiment of the invention, a method is used during which a ribbon of molten glass is formed on the surface of a bath of molten metal by the known float process, and activation is brought about while the ribbon floats on the bath. In this manufacturing process, the method according to the present invention can be continuously applied, thus obtaining very high production rates.

Preferably, after activation, the surface is placed in contact with an unsaturated organic substance capable of being directly fixed onto the surface by reaction with the fixed hydrogen.

This results in the formation of the beginning of an organic chain which is directly bonded to the silicon in the vitreous lattice in an extremely stable way, even in the presence of water and oxygen.

In some embodiments of the present invention, after activation, and prior to contact with the organic substance, the surface is heated and simultaneously outgassed in a high vacuum or scavenged with an inert gas. This feature is noteworthy through its application to certain forms of vitreous material since it helps to avoid the release of hydrogen.

Particularly advantageously, the organic substance which is contacted with the activated surface comprises a monomer and/or a prepolymer. It is found that when the organic substance is placed in contact with the activated siliceous surface, the organic radical is directly bonded to the siliceous surface.

Advantageously, the organic substance which is brought in contact with the activated surface is in gaseous form.

Preferably, when the organic substance which contacts the activated surface is a monomer, the monomer is selected from benzene, ethylene, propylene, isobutylene, vinyl benzene, vinyl chloride and tetrafluoroethylene. These monomers give rise to polymers which are widely used for coatings and layers associated with glass.

The present invention also includes a body having a surface of which at least a portion is vitreous and has been processed by a method as herein defined.

The present invention also includes apparatus for performing the method.

Preferably, the apparatus comprises two separate processing chambers, the first of which comprises heating means, means for holding the body, and a component made of a substance which can fix hydrogen onto a vitreous surface region of the body, such first chamber being connected to a device for supplying a hydrogenated atmosphere, and the second chamber comprising means for manipulating the body and a device for supplying organic substance.

It is to be understood that both the foregoing general description and the following detailed description are exemplary, but are not restrictive of the invention.

BRIEF DESCRIPTION OF THE DRAWINGS

The accompanying drawings, in which like numbers indicate like parts, illustrate examples of presently preferred embodiments of the invention and, together with the description, serve to explain the principles of the invention.

DETAILED DESCRIPTION OF THE PREFERRED EMBODIMENTS

Figure 1:
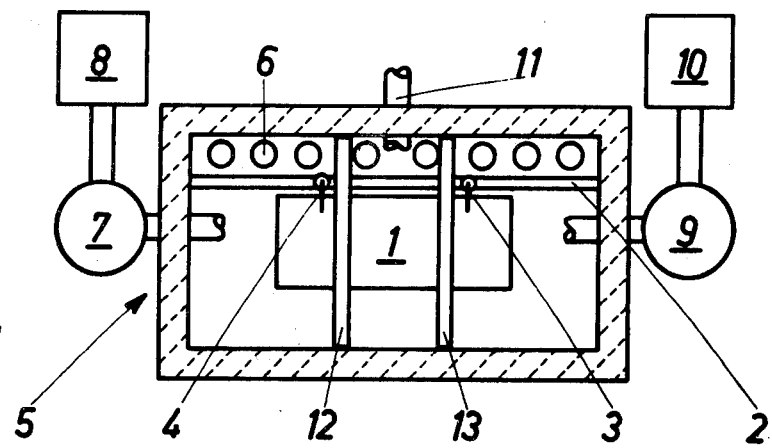
FIG. 1 is a partial section in elevation through a first embodiment of apparatus for performing one embodiemnt of the method of the present invention.

Referring now to the embodiment of FIG. 1, a glass sheet 1 is suspended in known manner from a monorail 2 by clamps 3 and 4 and is brought into a thermal treatment tank 5 which comprises known heating means, e.g., electric resistance heaters 6.

Tank 5 is connected to a suction pump and blower 7. Suction pump and blower 7 is connected to a container 8 containing a gas mixture comprising 10% hydrogen and an inert gas, e.g. nitrogen.

Tank 5 is also connected to a pump 9 and an ethylene container 10. Tank 5 also has a known outgassing device, symbolically represented by tube 11 in FIG. 1.

Tank 5 also has two nickel bars 12 and 13 disposed vertically in front of the path followed by the glass sheet 1 along monorail 2.

During operation, glass sheet 1 suspended from monorail 2 is first introduced into tank 5, after which tank 5 is closed. During a first step, outgassing device 11 is switched on so as to extract all the atmospheric air from tank 5, e.g. by scavenging with an inert gas (e.g., N$_2$). At the same time, electric resistance heaters 6 are connected so as to increase the temperature of the glass in tank 5.

When the glass reaches a temperature of 600° C., the hydrogen-containing gas mixture in container 8 is introduced into the tank by pump 7 at a pressure of one atmosphere. The glass is kept in contact with the gas mixture for 10 minutes at a temperature of 600° C.

During this first part of the treatment, the presence of the nickel bars 12 and 13 conditions the hydrogen and results in the fixing of hydrogen to the glass surface, more specifically to the silicon in the vitreous lattice of glass sheet 1. This has been shown by infrared spectroscopy. An absorption band centered at 2300 cm$^{-1}$ and characteristic of the

group has been discovered in the infrared spectrum of glass activated in this manner.

These Si—H bonds are stable under certain dehydration and deoxygenation conditions. However, the preservation of this state of activation cannot be ensured for very long under normal atmospheric conditions. Consequently, preferably directly after hydrogenation, the glass surface is placed in contact with ethylene $C_2H_4$ from container 10 via pump 9, after evacuating the hydrogenated atmosphere.

Owing to the high reactivity of the activated surface, a chemical reaction between ethylene and the substrate occurs within only a few minutes. Infrared spectroscopy shows high-intensity absorption bands centered at 2855 cm$^{-1}$ and 2925 cm$^{-1}$ and characteristic of polyethylene. At the same time, there is a weakening in the band for

bonds centered at 2300 cm$^{-1}$, which indicates that a reaction of the following type occurs:

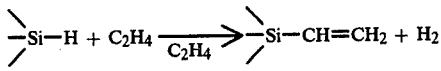

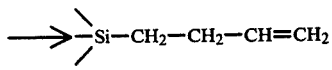

The resulting compound (polyethylene), which is directly fixed to the silicon in the siliceous glass lattice, is extremely stable and resistant e.g. to corrosion by water and oxygen and to outgassing in a high vacuum up to temperatures of 400° C.

The thus-treated glass surface has a first, highly stable organic chain onto which an organic polymer can be subsequently grafted with adhesion which is considerably improved over prior art processes. By way of example, paints based on polyvinyl resins can be used for the grafting.

Figure 2:
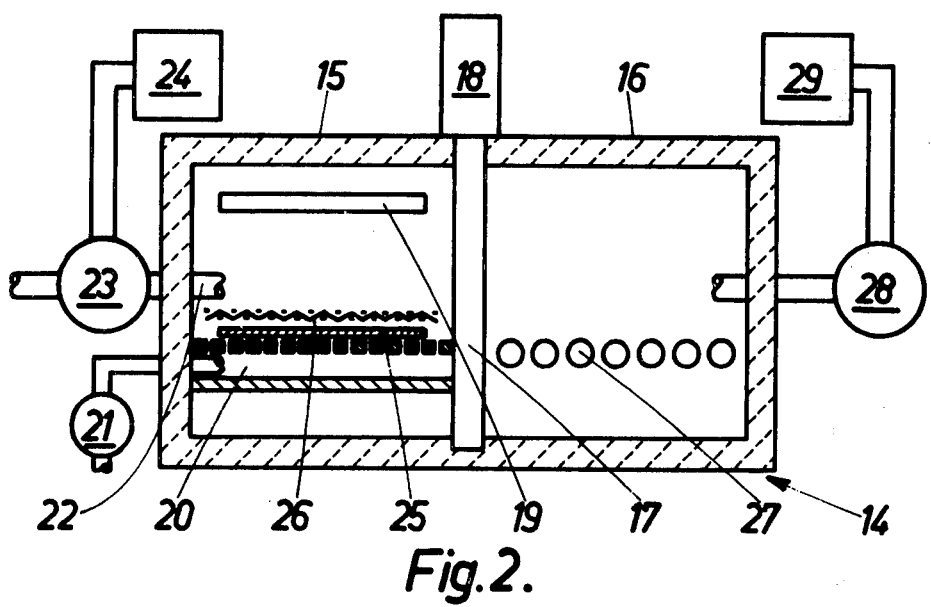
FIG. 2 is a partial section in elevation illustrating a second embodiment of an apparatus for performing another embodiment of the method of the present invention.

Turning now to FIG. 2, there is shown an embodiment in which the activating and further processing operations are performed separately. A tank 14 has two sealed communicating compartments 15 and 16, with the communication between the compartments being closed by a flap 17 actuated by a solenoid valve 18.

Compartment 15 includes heating means 19, e.g. electric resistance heaters. It also includes a known device providing support on a gas cushion, diagrammatically represented at 20 and supplied with a non-oxidizing, dehydrated gas, e.g. nitrogen, by a pump 21 connected to a source of such gas, not shown in the drawing.

Compartment 15 also has a gas inlet 22 connected to a pump 23 supplied by a container 24 of hydrogenated gas and capable of completely outgassing compartment 15.

A known grid 26 of stainless steel, e.g. 18/8 (18% chromium and 8% nickel) is disposed above the top surface of device 20 on a gas cushion and at a sufficient distance therefrom that a glass sheet 25 can be introduced between the gas cushion and the grid. Grid 26 serves as the conditioning substance for the hydrogen which is introduced into compartment 15.

Compartment 16 comprises a conveying device, e.g., a roller conveyor 27. Compartment 16 is connected to a pump 28 which in turn is connected to a container 29 containing benzene $C_6H_6$.

During operation, flap 17 is carefully closed and pump 21 is switched on and supplies an inert gas (e.g., $N_2$) to device 20. Next, a glass sheet 25 for processing is introduced into compartment 15 and disposed on the gas cushion. After compartment 15 has been closed in sealing-tight manner, the suction system of pump 23 is switched on so as to eliminate air, during which time the heating elements 19 raise the temperature of compartment 15. When the temperature of the glass reaches 650° C., a hydrogen-containing gas is introduced into compartment 15 by pump 23. The hydrogenated gas passes through and is conditioned by grid 26 and then contacts glass sheet 25. The gas is made up of nitrogen and hydrogen so that the atmosphere in the compartment is at a pressure of 2 Kg/cm$^2$ and its hydrogen content corresponds to a partial pressure of 152 mm Hg.

Allowing for the higher pressure inside compartment 15 as compared to the pressure in tank 5 in the previously described embodiment of FIG. 1, the reaction time can be reduced as compared to that in the above-described embodiment with respect to FIG. 1. In the present example relating to FIG. 2, it has been found that an excellent state of activation is obtained after the glass has been placed in contact with the hydrogen-containing gas for 8 minutes.

After this first step, the pressure of compartment 15 is brought to atmospheric pressure. At the same time, the heating elements 19 are switched off, so that the glass sheet 25 gradually cools. When it reaches about 500° C., sheet 25 is transferred on roller conveyor 27 from the gas cushion in compartment 15 to compartment 16. After the sheet has been held stationary in compartment 16, pump 28 is switched on and supplies benzene to compartment 16 from container 29. After a sufficient period in contact, benzene groups are directly fixed onto the glass surface. These bonds are particularly stable and can subsequently be used for grafting organic chains of a coating substance.

In a variant of the process just described, after treatment of the glass sheet 25 with hydrogenated gas in compartment 15, the interior of this compartment is subjected to sub-atmospheric pressure and the glass sheet is brought to a high temperature. After several hours under these conditions, the sheet is cooled to ambient temperature while the low pressure is maintained. Then, after the sheet is transferred to second compartment 16, ethylene is introduced into that compartment at ambient temperature. In this variant, bands are found by infrared spectrometry which give evidence of a chemical reaction between the activated surface and the organic gas which gives rise to the presence of polyethylene.

In a test procedure the glass sheet after the treatment with the hydrogenated gas, was heated to a temperature of about 850° C. while the pressure was maintained below $10^{-3}$ Torr for a period of three hours.

In another embodiment of the invention, which is not shown, but is similar in conception to the embodiment of FIG. 2, the adhesion of organic coatings on cellular glass plates can be considerably improved in order to improve the resistance to crumbling.

To this end, in a glass plate expansion tank similar to compartment 15 in FIG. 2, the freshly-expanded glass can be scavenged, after the expansion operation, with a conditioned hydrogen-containing gas at temperature near the expansion temperature (e.g. 750° C. if the foaming agent is calcium carbonate). Next, the thus-activated surface of the expanded glass is treated with a suitable unsaturated monomer in the same manner as previously described.

Figure 3:
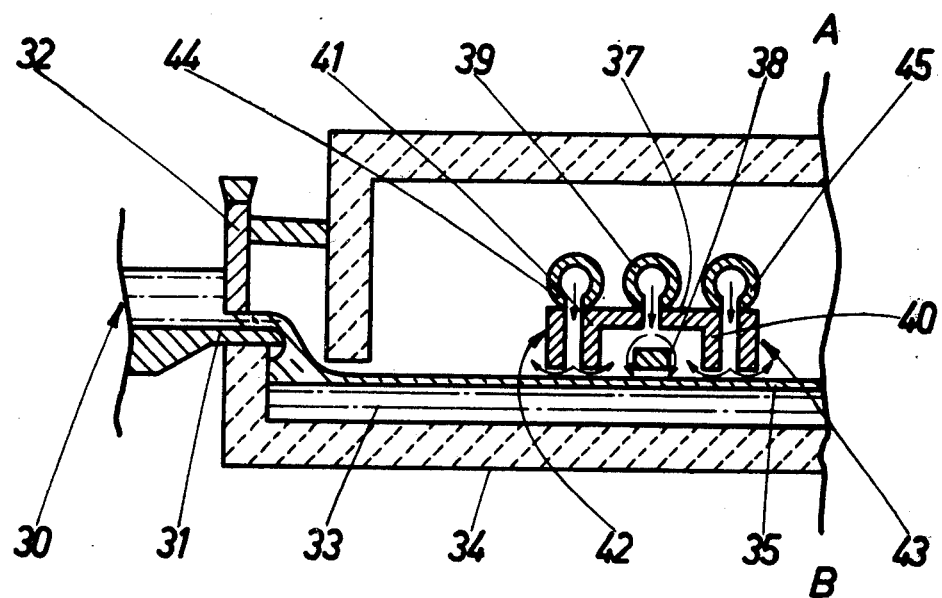
FIG. 3 is a partial section through an installation for manufacturing a continuous glass ribbon by the "float" method, and in which installation a further embodiment of the method of the present invention is performed.
Figure 3:
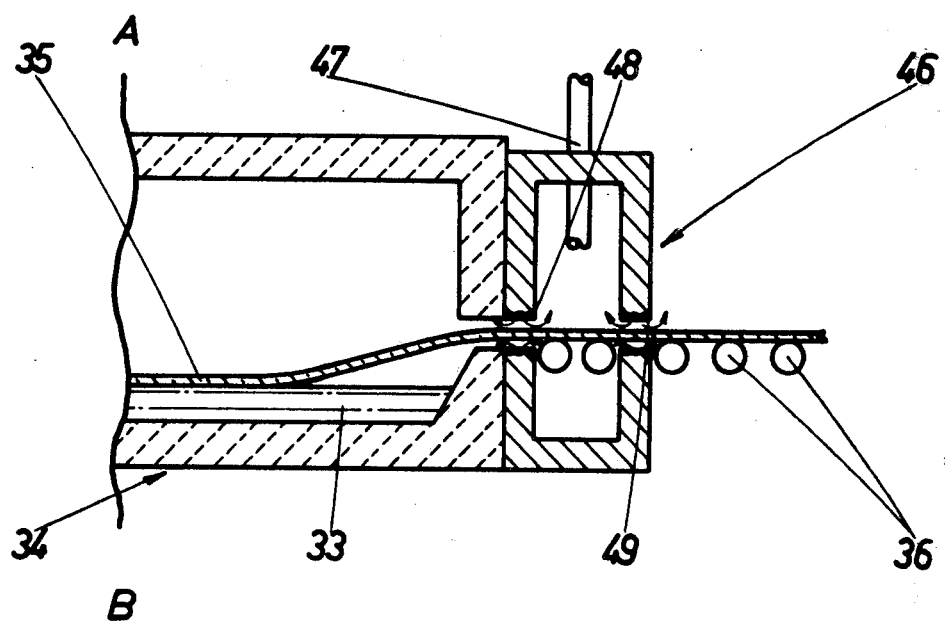

Referring now to FIG. 3, there is shown an embodiment of the invention applied to the float process, in which a continuous ribbon of flat glass is manufactured by floating on a bath of a molten metal which is denser than glass.

In this method of manufacture, molten glass coming from a melting furnace (not shown in the drawing) flows along a feed channel 30 to lip 31. The flow rate of molten glass along the feed channel is regulated by a tweel 32, the vertical position of which is adjusted by a known device (not shown). The molten glass leaves the lip and falls onto the surface of a bath 33 of a metal denser than glass, e.g. tin. The tin bath 33 is enclosed in a completely sealed float tank 34. The molten glass spreads over the surface of the tin bath until it has an equilibrium thickness when it forms a ribbon 35 and subsequently travels over the tin bath at the same rate as it is extracted from float tank 34.

Float tank 34 contains a protective atmosphere substantially comprising an inert gas, usually nitrogen. Heating elements (not shown) regulate the heating of float tank 34 in which the molten glass undergoes controlled cooling from approximately 1000° C., i.e. the temperature at which it is poured onto the metal bath, to approximately 550° C., the temperature at which the glass leaves the float tank.

When extracted from the float tank, ribbon 35 is lifted from bath 33 and carried by a roller conveyor 36.

According to this embodiment of the invention, a chamber 37 is disposed in the hot part of float tank 34 in a region where the temperature of the glass 35 is 830° C. Chamber 37 contains a platinum bar 38 as a conditioning substance for hydrogen, and a hydrogen-containing gas flows from a supply pipe 39 over bar 38. The gas consists of nitrogen containing hydrogen at a partial pressure of the order of 80mm Hg, the total pressure of the gas being about the atmospheric pressure.

The side walls 40 and 41 of chamber 37 have known gas seals 42 and 43 each supplied with pure nitrogen through pipes 44 and 45, respectively.

The hydrogen-containing gas supplied by pipe 39 enters chamber 37, in which it flows in the manner diagrammatically illustrated by arrows. Contact between the hydrogenated gas and the glass after the hydrogen has been conditioned by its contact with bar 38 results in the fixing of hydrogen atoms onto the surface of the glass ribbon as it moves forward.

The state of activation is maintained during the entire forward motion of the ribbon on the tin bath, and its intensity is undiminished since the protective atmosphere is free from oxygen and water.

After leaving float tank 34, the ribbon immediately enters a closed chamber 46 in which the atmosphere is supplied by a known device, diagrammatically shown at 47, and contains a mixture of nitrogen and an unsaturated monomer. The ends of chamber 46 have known gas seals 48 and 49 supplied with nitrogen.

In view of its high surface quality, the glass obtained by this method is often used for making laminated panels. In one application, the monomer is advantageously vinyl chloride, which is fixed onto the ribbon surface and forms the first link of a polyvinyl chloride (PVC) chain. Subsequently, a laminated panel is bonded together by sticking two glass sheets and an intervening PVC sheet, and the adhesion of the PVC is increased since the first PVC link is directly grafted onto the glass.

Instead of using vinyl chloride as monomer, it is possible to use propylene, isobutylene, vinyl benzene or tetrafluoroethylene. In each of these cases, a chain of the corresponding polymer can be formed which is directly fixed to the surface of the glass.

In place of the platinum bar 38, use can be made of one or more of the metals described in relation to the embodiment of FIGS. 1 and 2, namely, Ni, Cr and Fe. Alternatively or in addition, one or more of Ta, Ti, Hf, Nb, W, Co and Pa may be used.

Figure 4:
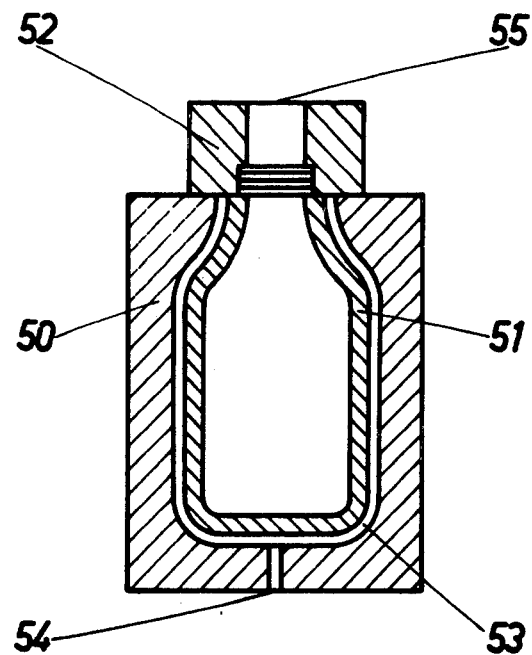
FIG. 4 is a partial section illustrate a fourth embodiment of an apparatus for performing a still further embodiment of the method of the invention.

Turning now to the embodiment illustrated in FIG. 4, the present invention is applied to processing hollow glass, more particularly glass bottles, which are more and more commonly being covered with plastics to protect them during various handling operations.

FIG. 4 diagrammatically represents one half of a two half mold for manufacturing bottles by the known blow molding method.

The mold walls 50 have an inner lining 51 made of a porous metal-containing alloy prepared by sintering in known manner and serving as the conditioning substance for hydrogen. Walls 50 are surmounted by a ring 52 in a manner well known to hollow-glass manufacturers. The inner lining 51 of the mold is secured to walls 50 so as to leave a space 53 connected by a pipe 54 to the exterior.

During operations, a glass parison is enclosed in sealing-tight manner between the two halves of the mold. When the glass reaches approximately 925° C., a blowing gas is introduced through an orifice diagrammatically represented at 55 at a pressure of approximately 3 Kg/cm$^2$ into the parison to shape the bottles. A known device (not shown) connected to pipe 54 injects a certain quantity of a hydrogen-containing gas, e.g. nitrogen and hydrogen, into space 53 at a partial pressure of 230 mm Hg. The gas travels through the pores of the alloy of inner lining 51 to thereby become conditioned and forms a film between the glass and the inner lining 51 and activates the glass surface. Next, ethylene $C_2H_4$ is introduced into space 53 and travels through inner lining 51 so as to become fixed on the outer surface of the bottle and form the first link of a polyethylene chain onto which a protective polyethylene layer can subsequently be grafted.

Another particularly interesting application of the present invention relates to imparting adhesiveness to reflecting beads used in paint for road signs and signals. The beads, in a fluidizing bed, can be conveyed first in a hydrogen-containing atmosphere at an adequate temperature and in the presence of a conditioning substance to fix hydrogen onto the beads, and then conveyed in an atmosphere charged with an unsaturated monomer which becomes fixed to the beads. The choice of the unsaturated monomer depends on the nature of the subsequently-used paint.

Another, equally interesting application of the present invention is the activation of glass fibres for improving their adhesion when used to reinforce plastics.

It will be understood that the above description of the present invention is susceptible to various modifications, changes and adaptations, and the same are intended to be comprehended within the meaning and range of equivalents of the appended claims.

What is claimed is:

1. A method of processing a body having a surface of which at least a portion is vitreous and during which the vitreous region or regions of said surface become(s) activated, comprising contacting the surface, while it is at elevated temperature, with gaseous hydrogen in a non-oxidizing, dehydrated atmosphere, after such hydrogen has been conditioned by contact at elevated temperature with a substance which is a metal or metal alloy comprising at least one metal selected from one or more of groups IIIB, IVB, VB, VIB, VIIB and VIII of the periodic table of elements, and which is capable of provoking the fixation of hydrogen to the vitreous region or regions of said surface, to thereby activate the vitreous surface such that an organic radical can be directly grafted onto said surface.

2. A method according to claim 1, wherein the metal is selected from Ti, Hf, Nb, Ta, Cr, W, Fe, Co, Ni, Pd and Pt.

3. A method according to claim 1 wherein said surface and said substance are contained in the same heated chamber.

4. A method according to claim 1 wherein the substance is in the solid state near said surface.

5. A method according to claim 1 wherein said surface and said substance are at substantially the same elevated temperature.

6. A method according to claim 1 wherein said surface is kept at a temperature between 600° and 1000° C. during the activation treatment.

7. A method according to claim 1 wherein the non-oxidizing, dehydrated atmosphere contains hydrogen at a partial pressure of at least 10 mm Hg.

8. A method according to claim 1 wherein the atmosphere is used to scavenge at least one region of the surface.

9. A method according to claim 1 wherein the hydrogenated atmosphere is maintained at a pressure of at least 1 kg/m$^2$.

10. A method according to claim 1 wherein the body is a continuous ribbon of molten glass formed on the surface of a bath of molten metal by the known "float" method, and the surface of such ribbon is contacted with hydrogen which has been conditioned to bring about activation while the ribbon floats on the bath.

11. A method according to claim 1 wherein, after activation, the surface is placed in contact with an unsaturated organic substance capable of becoming directly fixed to the surface by reaction with the fixed hydrogen.

12. A method according to claim 11 wherein after activation and prior to contact with the organic substance, the surface is heated and simultaneously outgassed in a high vacuum.

13. A method according to claim 11 wherein after activation and prior to contact with the organic substance, the surface is heated and simultaneously scavenged with an inert gas.

14. A method according to claim 11 wherein the organic substance which is brought into contact with the activated surface is in gaseous form.

15. A method according to claim 11 wherein the organic substance comprises a monomer and/or a prepolymer.

16. A method according to claim 15 wherein the monomer is selected from benzene, ethylene, propylene, isobutylene, vinyl benzene, vinyl chloride and tetrafluoroethylene.

17. A body having a surface of which at least a portion is vitreous and has been processed by a method according to claim 11.

* * * * *